(12) United States Patent
Tanouchi et al.

(10) Patent No.: US 11,626,718 B2
(45) Date of Patent: Apr. 11, 2023

(54) MOTOR DRIVE APPARATUS INCLUDING BUS BAR

(71) Applicant: Fanuc Corporation, Yamanashi (JP)

(72) Inventors: Hironao Tanouchi, Yamanashi (JP); Jianzhou Chen, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 196 days.

(21) Appl. No.: 17/102,753

(22) Filed: Nov. 24, 2020

(65) Prior Publication Data

US 2021/0194231 A1 Jun. 24, 2021

(30) Foreign Application Priority Data

Dec. 20, 2019 (JP) .............................. JP2019-230760

(51) Int. Cl.
 *H02G 5/02* (2006.01)
(52) U.S. Cl.
 CPC .................................. *H02G 5/025* (2013.01)
(58) Field of Classification Search
 CPC ............. H01H 2085/2055; H01R 9/00; H05K 7/1432; H05K 2201/10272; H05K 1/189; H05K 5/0247; H05K 1/0263; H05K 1/181; H05K 2201/10037; H05K 7/1457; H05K 7/20927; H05K 7/1492; H05K 2201/10166; H05K 3/328; H05K 7/026; H05K 7/209; H05K 1/0204; H05K 1/0265; H05K 1/028; H05K 1/18; H05K 2201/10416; H05K 3/202; H05K 3/3447; H05K 1/02; H05K 1/0203; H05K 1/0393; H05K 13/06; H05K 2201/053; H05K 2201/09063; H05K 2201/10015; H05K 2201/10287; H05K 2203/0195; H05K 2203/0285; H05K 3/103; H05K 3/281; H05K 3/34; H05K 5/03; H05K 7/06; H05K 7/1427; H05K 7/2089; H05K 1/0233; H05K 1/0366; H05K 1/118; H05K 1/144; H05K 1/182; H05K 2201/012; H05K 2201/086; H05K 2201/09054; H05K 2201/09072; H05K 2201/10022;

(Continued)

(56) References Cited

U.S. PATENT DOCUMENTS 5,065,283 A * 11/1991 Adachi ................ H05K 1/0263
 439/84
5,329,424 A * 7/1994 Patel ...................... H05K 3/301
 361/748

(Continued)

FOREIGN PATENT DOCUMENTS

| JP | 06302932 A | 10/1994 |
|---|---|---|
| JP | 07029874 U | 6/1995 |
| JP | 2011234488 A | 11/2011 |

*Primary Examiner* — Krystal Robinson
(74) *Attorney, Agent, or Firm* — RatnerPrestia

(57) ABSTRACT

A motor drive apparatus includes a bus bar through which a current associated with motor driving flows, a printed circuit board, and a conductive support pedestal mounted on the printed circuit board and interposed between the bus bar and the printed circuit board, wherein the conductive support pedestal includes at least one hole for screw passing configured to fasten the bus bar and the conductive support pedestal with screw tightening, and a terminal unit for a printed circuit board configured to electrically connect an electric wire provided in the printed circuit board to the conductive support pedestal.

10 Claims, 12 Drawing Sheets

(58) Field of Classification Search
CPC .......... H05K 2201/10106; H05K 2201/10189; H05K 2201/10196; H05K 2201/10303; H05K 2201/10977; H05K 2201/2072; H05K 3/0058; H05K 3/341; H05K 3/3485; H05K 3/4092; H05K 5/0017; H05K 5/0021; H05K 5/0026; H05K 5/0069; H05K 5/0204; H05K 5/0256; H05K 7/00; H05K 7/20; H05K 7/20218; H05K 7/20254; H05K 7/2039; H05K 7/20809; H05K 7/20872; H05K 1/0284; H05K 1/05; H05K 1/092; H05K 2201/09081; H05K 2201/09118; H05K 2201/09263; H05K 2201/09972; H05K 2201/1003; H05K 2201/10151; H05K 2201/10181; H05K 2201/10621; H05K 3/00; H05K 3/28; H05K 3/284; H05K 7/1452; H05K 7/20136; H05K 7/20172; H05K 7/20727; H05K 7/20909; H05K 7/20936; H02B 1/20; H02B 1/21

See application file for complete search history.

(56) References Cited

U.S. PATENT DOCUMENTS

| | | | | |
|---|---|---|---|---|
| 5,442,142 A * | 8/1995 | Hayashi | ............... | H01R 12/523 |
| | | | | 174/250 |
| 6,007,350 A * | 12/1999 | Isshiki | ................. | H01R 9/2458 |
| | | | | 439/949 |
| 6,244,876 B1 * | 6/2001 | Saka | ................... | H05K 3/4092 |
| | | | | 174/59 |

\* cited by examiner

MOTOR DRIVE APPARATUS INCLUDING BUS BAR

CROSS-REFERENCE TO RELATED APPLICATIONS

This application is a new U.S. Patent Application that claims benefit of Japanese Patent Application No. 2019-230760, filed Dec. 20, 2019, the disclosure of which is incorporated herein by reference in its entirety for all purposes.

BACKGROUND OF THE INVENTION

1. Field of the Invention

The present invention relates to a motor drive apparatus including a bus bar.

2. Description of the Related Art

In a motor drive apparatus that drives motors in a machine tool, forging machinery, an injection molding machine, industrial machinery, or various robots, power supplied from an alternating-current power supply or a direct-current power supply is converted by a power conversion circuit into power (motor drive power) for driving the motor. Power conversion circuits include an inverter that converts input direct-current power into alternating-current power and outputs the alternating-current power, and a rectifier (also referred to as a "converter") that converts input alternating-current power into direct-current power and outputs the direct-current power. For example, alternating-current power supplied from the alternating-current power supply is once converted into direct-current power by the rectifier, the direct-current power is further converted into alternating-current power by the inverter, and the converted alternating-current power is supplied as motor drive power.

A rectifier of a diode rectification type is constituted of a full-bridge circuit of a diode. Moreover, a rectifier and an inverter of a PWM control type and a 120-degree energization type are each constituted of, for example, a full-bridge circuit including a semiconductor switching element for high power and a diode connected in antiparallel with the element. Hereinafter, the diode and the semiconductor switching element for high power provided in each of the rectifier and the inverter are briefly referred to as "power devices". In a power conversion circuit including a rectifier and an inverter, since relatively high current flows through a power device, a bus bar made of a metal such as copper, brass, or aluminum is used for electric connection of the power device to an electrode terminal. Further, the power conversion circuit is provided with various electric circuits, such as a main circuit constituted of a full-bridge circuit of the power device, a control circuit for controlling power conversion, a detection circuit for detecting current or voltage used for various kinds of processing such as power conversion and abnormality detection, and a snubber circuit for protecting a circuit from a surge voltage generated during an on/off time of the semiconductor switching element for high power that is one of the power device. Each of these electric circuits is composed of various components such as a resistance, a condenser, an inductor, a diode, a field effect transistor (FET), an operational amplifier, a photo coupler, an analog-digital conversion circuit (ADC), a digital-analog conversion circuit (DAC), or various integrated circuits. Thus, circuit wiring is often reduced in size and simplified by collectively mounting these components on a printed circuit board. In a motor drive apparatus, a printed circuit board mounted with various components is disposed closely to and electrically and physically connected to a power device. For example, a detection circuit that detects current flowing in or out of the power device via a bus bar, and a detection circuit that detects potential of the bus bar connected to the power device are provided on the printed circuit board. In this case, the bus bar is not only electrically connected to an input/output terminal of the power device, but also electrically connected to an electric wire leading to the detection circuit in the printed circuit board.

For example, as described in Japanese Unexamined Patent Publication No. H6-302932, there is known a printed wiring board including an electrode terminal that has, at predetermined positions, a hole for passing screw or the like and a claw portion for soldering onto the printed wiring board and that is constituted of a good-conduction metal flat plate to which folding processing has been applied, and an attachment hole that is adapted to put in the claw portion of the electrode terminal and that is equipped with a wire connecting to a mounted component on the printed wiring board, and also including a perforation at a position immediately under the hole for passing screw or the like in a state where the claw portion of the electrode terminal is put in the attachment hole, wherein the printed wiring board and the electrode terminal are fixed by putting the claw portion into the attachment hole of the printed wiring board and soldering the claw portion.

For example, as described in Japanese Unexamined Patent Publication No. 2011-234488, there is known a power conversion apparatus (1) including a plurality of semiconductor modules (16A, 16b) constituting a part of a power conversion circuit, a control circuit unit (25) configured to be electrically connected to the semiconductor modules (16A, 16b) and configured to control the semiconductor modules (16A, 16b), a bus bar (23) that is electrically connected to the semiconductor modules (16A, 16b) and that brings power in and out of the semiconductor modules (16A, 16b), a terminal block (24) mounted with a high-voltage cable (30) that brings power from and to an outside and the bus bar (23) and connected with the bus bar (23) and the high-voltage cable (30), and a storage case (26) that stores the semiconductor modules (16A, 16b), the bus bar (23), and the terminal block (24), wherein the storage case (26) includes a first insertion hole (29) and a second insertion hole (38) through which the high-voltage cable (30) is insertable, a work hole (35) formed opposite to the terminal table (24) in order to perform an operation of coupling the high-voltage cable (30) to the terminal block (24), an insertion hole lid (39) that closes one of the first insertion hole (29) and the second insertion hole (38) through which the high-voltage cable (30) is not inserted, and a work hole lid (36) that closes the work hole, the first insertion hole (29) and the second insertion hole (38) are formed at positions opposite to each other across the terminal block (24), and the work hole (35) is formed in a direction orthogonal to a direction linking the first insertion hole (29) and the second insertion hole (38) together.

For example, as described in Japanese Unexamined Utility Model Application Publication No. H07-29874, there is known a connection structure of a high-current printed board, wherein a terminal unit is fixed to the high-current printed board in such a way as to pass therethrough from one side to another side and protrude to both sides of the high-current printed board, and a conductor or a high-current element contacting the another side of the terminal unit is tightened and fixed to a hole of the terminal unit by a screw member inserted from one side to the another side (e.g., see Patent Literature 3).

SUMMARY OF INVENTION

A shape of a bus bar is designed according to, for example, a disposition of a component in a motor drive apparatus, and a dimension, a shape, and the like of the motor drive apparatus. Thus, for manufacture of the motor drive apparatus, a stock of a plurality of kinds of bus bars different in shape have to be secured, leading to complicated manufacture management. Moreover, a bus bar is manufactured by, for example, performing sheet metal working on a metal plate of copper, brass, aluminum, or the like. Thus, as a shape of a bus bar to be manufactured becomes complicated, many parts resulting in waste materials (i.e., parts that do not serve as bus bar products) are produced in a metal plate that is a raw material at the sheet metal working. With more waste materials, a manufacturing cost of the motor drive apparatus increases. Moreover, it is preferable to prepare a die suited to a shape of a bus bar to be manufactured. Thus, the more kinds of shapes of bus bars, the more dies need to be prepared, and a manufacturing cost of the motor drive apparatus increases. Further, the more complicated the shapes of bus bars, the weaker the strength and vibration resistance become. Therefore, in the motor drive apparatus, achievement of a connection structure for a bus bar, a power device, and a printed circuit board with high strength, high vibration resistance, and a low cost is desired.

According to one aspect of the present disclosure, a motor drive apparatus includes a bus bar through which a current associated with motor driving flows, a printed circuit board, and a conductive support pedestal mounted on the printed circuit board and interposed between the bus bar and the printed circuit board, wherein the conductive support pedestal includes at least one hole for screw passing configured to fasten the bus bar and the conductive support pedestal with screw tightening, and a terminal unit for a printed circuit board configured to electrically connect an electric wire provided in the printed circuit board to the conductive support pedestal.

BRIEF DESCRIPTION OF THE DRAWINGS

The present invention will be more clearly understood with reference to the following accompanying drawings.

DETAILED DESCRIPTION

A motor drive apparatus including a bus bar will be described below with reference to the drawings. These drawings use different scales as appropriate to facilitate an understanding. The form illustrated in each drawing is one example for carrying out the present disclosure, and the present disclosure is not limited to the embodiments illustrated in these drawings. Hereinafter, "electrically connected (i.e., electrifiably connected)" may be briefly referred to as "connected".

A motor drive apparatus according to an embodiment of the present disclosure includes a bus bar through which a current associated with motor driving flows, a printed circuit board, and a conductive support pedestal mounted on the printed circuit board and interposed between the bus bar and the printed circuit board. The conductive support pedestal includes at least one hole for screw passing configured to fasten the bus bar and the conductive support pedestal with screw tightening, and a terminal unit for a printed circuit board configured to electrically connect an electric wire provided in the printed circuit board to the conductive support pedestal. Machinery provided with a motor by which a motor drive apparatus drives includes, for example, a machine tool, a robot, forging machinery, an injection molding machine, industrial machinery, various household appliances, a train, a car, an aircraft, and the like. Embodiments of the present disclosure are cited below.

First, a motor drive apparatus according to a first embodiment of the present disclosure is described.

Figure 1:
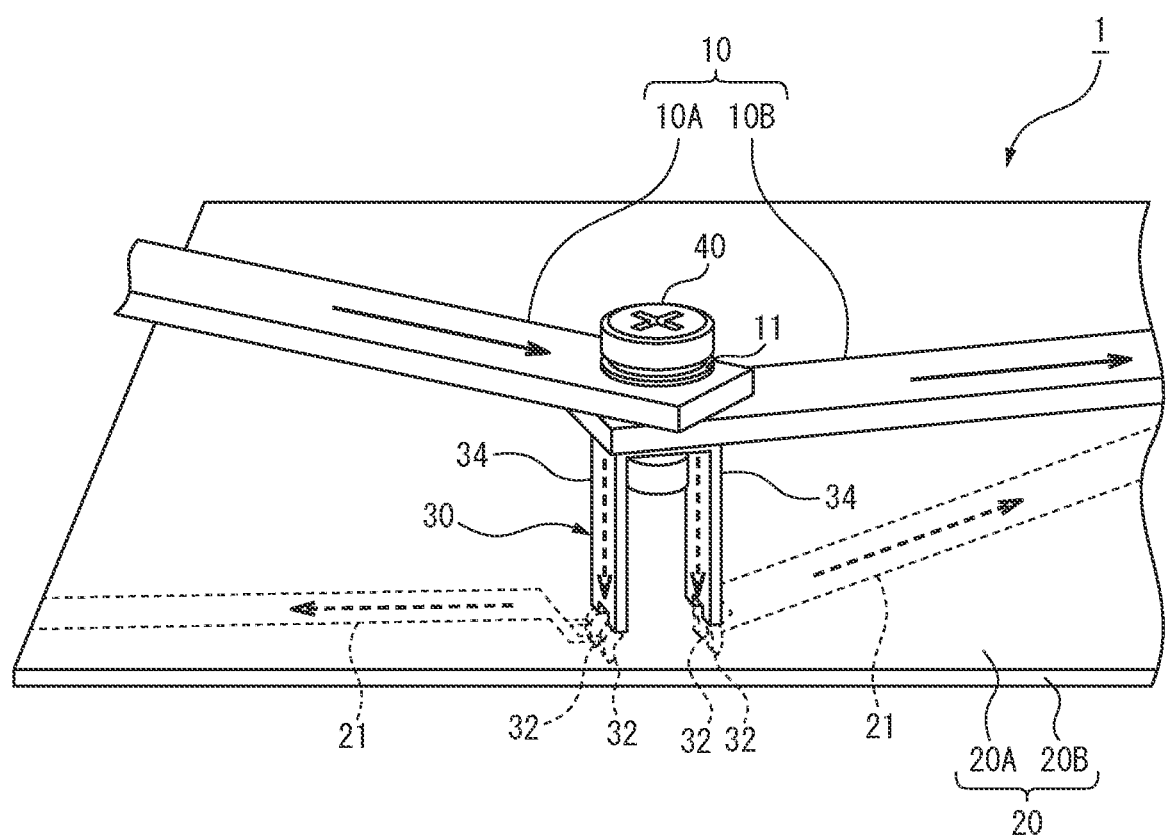
FIG. 1 is a perspective view illustrating a connection structure for a bus bar, a printed circuit board, and a conductive support pedestal in a motor drive apparatus according to a first embodiment of the present disclosure.
Figure 2:
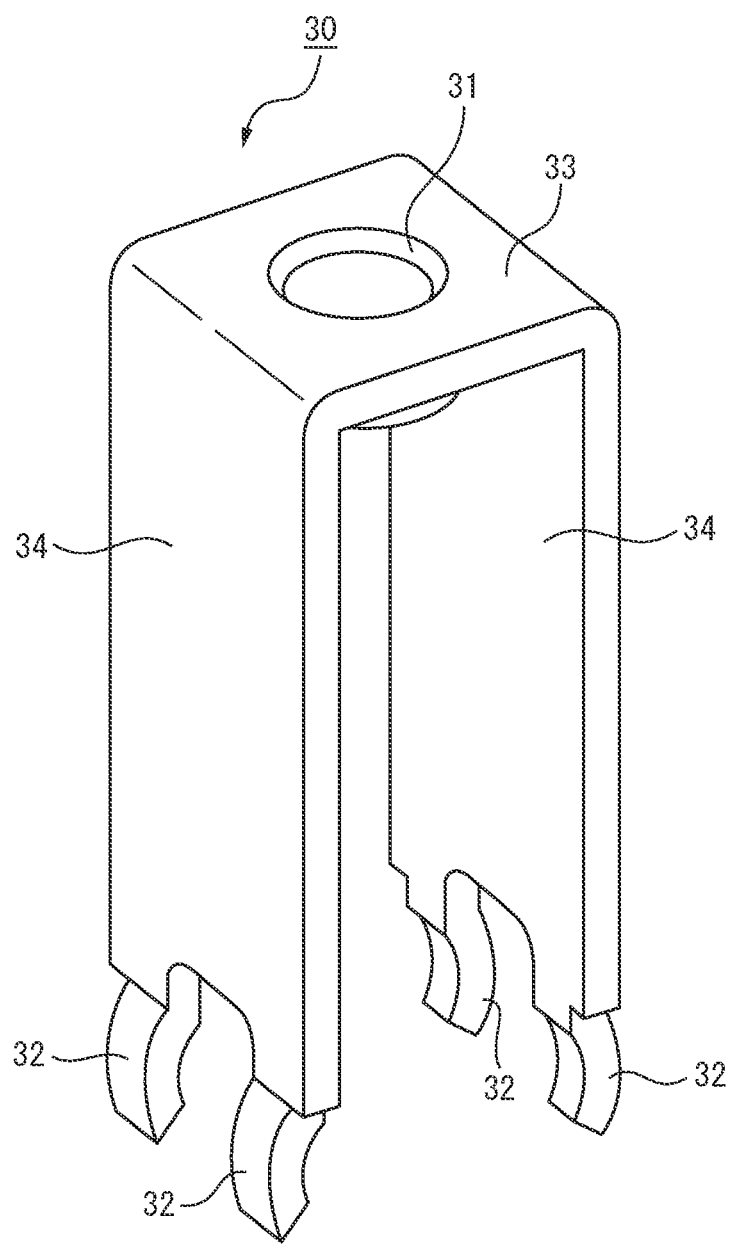
FIG. 2 is a perspective view illustrating the conductive support pedestal in the motor drive apparatus according to the first embodiment of the present disclosure.

FIG. 1 is a perspective view illustrating a connection structure for a bus bar, a printed circuit board, and a conductive support pedestal in the motor drive apparatus according to the first embodiment of the present disclosure. FIG. 2 is a perspective view illustrating the conductive support pedestal in the motor drive apparatus according to the first embodiment of the present disclosure.

A motor drive apparatus 1 according to the first embodiment of the present disclosure includes a bus bar 10, a printed circuit board 20, and a conductive support pedestal 30.

The bus bar 10 is a conductor for conducting relatively high current, made of a metal such as copper, brass, or aluminum, and manufactured by, for example, sheet metal working. The bus bar 10 is molded into a rectangular-parallelepiped shape (straight plate shape). The bus bar 10 is provided with a hole for screw passing 11 configured to fasten the bus bar 10 and the conductive support pedestal 30 with screw tightening.

Members directly or indirectly connected to the bus bar 10 include, for example, a power device inside a power conversion circuit for generating motor drive power, a power supply, a high-capacity condenser, other equipment associated with motor driving, and the like. For example, the bus bar 10 is connected to an input terminal and an output terminal of the power device. Examples of power conversion circuits include a rectifier, an inverter, and the like. The rectifier converts alternating-current power input from an alternating-current power source into direct-current power, and outputs the direct-current power to a DC link. The inverter converts direct-current power in the DC link into alternating-current power, and outputs the alternating-current power as drive power for a motor. Thus, a current associated with motor driving flows through the bus bar 10. Examples of power devices to be connected to the bus bar 10 may include a diode, a unipolar transistor such as an FET, a bipolar transistor, an IGBT, a thyristor, a semiconductor switching element for high power such as a GTO, and the like. A rectifier of a diode rectification type is constituted of a full-bridge circuit of a diode. A rectifier and an inverter of a PWM control type and a 120-degree energization type are each constituted of, for example, a full-bridge circuit including a semiconductor switching element for high power and a diode connected in antiparallel with the element.

Various electric circuits are provided on the printed circuit board 20; such as a control circuit for controlling power conversion of a power conversion circuit having a power device, a detection circuit for detecting current or voltage used for various kinds of processing such as power conversion and abnormality detection, and a snubber circuit for protecting a circuit from a surge voltage generated during an on/off time of the power device. Each of these electric circuits is composed of various components such as a resistance, a condenser, an inductor, a diode, a field effect transistor (FET), an operational amplifier, a photo coupler, an analog-digital conversion circuit (ADC), a digital-analog conversion circuit (DAC), or various integrated circuits. These components are mounted on the printed circuit board 20, and are suitably connected to one another by an electric wire depending on a function of the electric circuit including the components. Among various electric circuits provided on the printed circuit board 20, a detection circuit that detects current flowing in or out of the power device via the bus bar 10 or detects potential of the bus bar 10 connected to the power device, a snubber circuit, and the like are electrically connected to the bus bar 10. Among electric wires provided on the printed circuit board 20, an electric wire on the printed circuit board 20 electrically connected to the bus bar 10 is hereinafter referred to as an "electric wire 21". The electric wire 21 may be provided inside the printed circuit board 20 (i.e., may be buried therein), may be provided on a first surface 20A of the printed circuit board 20, or may be provided on a second surface 20B of the printed circuit board 20. In the example illustrated in the drawing, the electric wire 21 is provided inside the printed circuit board 20, as one example.

The conductive support pedestal 30 is mounted on the printed circuit board 20, and interposed between the bus bar 10 and the printed circuit board 20. The bus bar 10 is connected to the printed circuit board 20 via the conductive support pedestal 30, and therefore has high vibration resistance.

The conductive support pedestal 30 includes an upper plate portion 33, a pair of side plate portions 34 extended from a pair of edges of the upper plate portion 33 in a direction crossing the upper plate portion 33 and disposed with a space in between, and the side plate portions 34 are attached at ends thereof to the printed circuit board 20.

In the first embodiment, one hole for screw passing 31 configured to fasten the bus bar 10 and the conductive support pedestal 30 with screw tightening is provided in the upper plate portion 33 or the side plate portion 34 of the conductive support pedestal 30. In the example illustrated in FIGS. 1 and 2, one hole for screw passing 31 is provided in the upper plate portion 33, as one example.

Furthermore, a terminal unit for a printed circuit board 32 configured to electrically connect the electric wire 21 of the printed circuit board 20 to the conductive support pedestal 30 by soldering is provided at the end of the side plate portion 34. The terminal unit for a printed circuit board 32 has, for example, a claw shape with a spring property (elasticity). The terminal unit for a printed circuit board 32 fits into a hole provided in the printed circuit board 20, thereby firmly fixing the conductive support pedestal 30 onto the first surface 20A or the second surface 20B of the printed circuit board 20, and electrically connecting the electric wire 21 provided inside the printed circuit board 20 to the conductive support pedestal 30. In the example illustrated in FIG. 1, the conductive support pedestal 30 is mounted on the first surface 20A of the printed circuit board 20 via the terminal unit for a printed circuit board 32, as one example. A shape of the terminal unit for a printed circuit board 32 may be a shape other than the illustrated claw shape. Moreover, for example, the terminal unit for a printed circuit board 32 may be electrically connected to the electric wire 21 provided inside the printed circuit board 20 via a land provided in the printed circuit board 20.

In the first embodiment, a plurality of bus bars 10 (bus bars 10A and 10B in the example illustrated in FIG. 1) are connected to one hole for screw passing 31 provided in the conductive support pedestal 30. By providing a plurality of conductive support pedestals 30 in the printed circuit board 20, and connecting a plurality of bus bars 10 to one hole for screw passing 31 provided in the conductive support pedestal 30 in such a way that the plurality of bus bars 10 are arranged, current paths having various shapes and lengths can be formed. The connection structure for the bus bar, the printed circuit board, and the conductive support pedestal according to the first embodiment is described in more detail in comparison with a conventional example.

Figure 3:
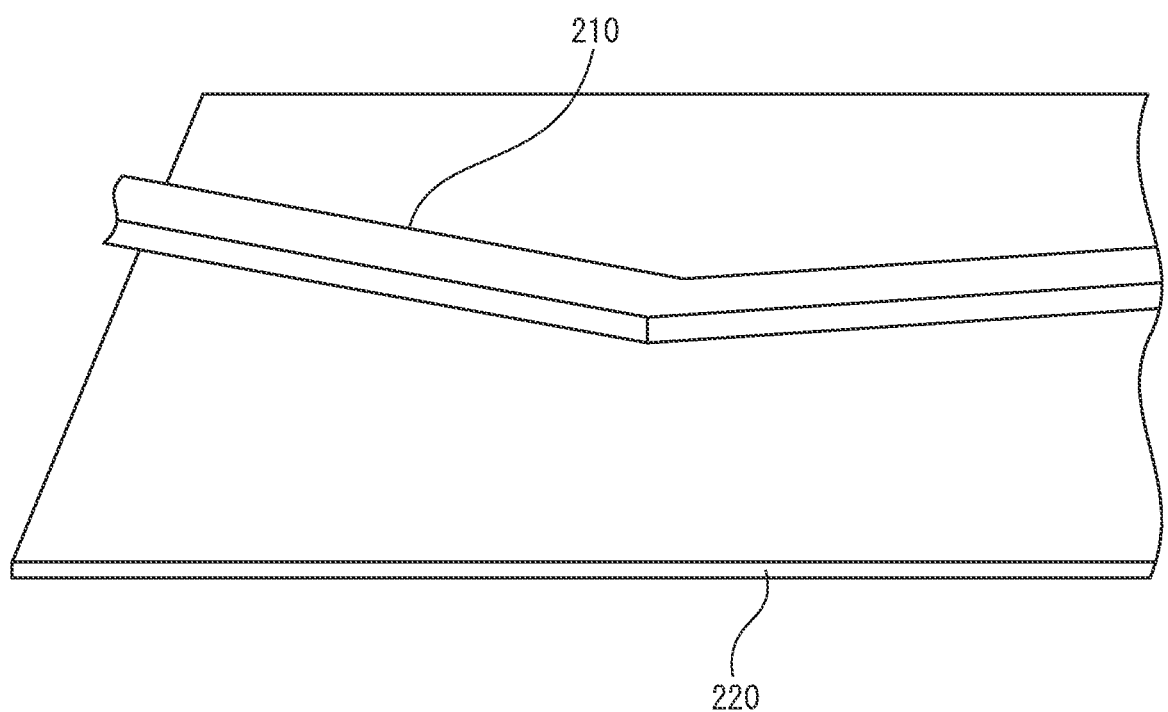
FIG. 3 is a perspective view exemplifying a shape of a conventional bus bar having a bent portion.

FIG. 3 is a perspective view exemplifying a shape of a conventional bus bar having a bent portion. Conventionally, when a part that does not become straight is produced in a current path depending on a disposition of a component in a motor drive apparatus and a dimension, a shape, and the like of the motor drive apparatus, a bus bar 210 having a bent portion is used. A bent portion of the bus bar 210 has a problem of being weak in strength and vibration resistance in particular.

In contrast, in the first embodiment, when a bent portion being a portion that does not become straight is produced in a current path depending on a disposition of a component in the motor drive apparatus and a dimension, a shape, and the like of the motor drive apparatus, the conductive support pedestal 30 is disposed on the printed circuit board 20 (on the first surface 20A in the example illustrated in FIG. 1) immediately under the bent portion. Then, a screw 40 is put into the holes for screw passing 11 of the bus bars 10A and 10B molded into a rectangular-parallelepiped shape (straight plate shape) and the hole for screw passing 31 of the conductive support pedestal 30, and the bus bar 10A, the bus bar 10B, and the conductive support pedestal 30 are electrically and physically connected to one another by fastening with screw tightening via the screw 40. The bus bar 10A and the bus bar 10B make a predetermined angle on substantially the same plane, and thus form a bent portion. Thus, according to the first embodiment, since the bus bar 10 is physically fixed to the printed circuit board 20 via the terminal unit for a printed circuit board 32 of the conductive support pedestal 30 in a portion to be a bent portion of a current path, strength and vibration resistance are high.

Furthermore, the bus bar 10 (the bus bars 10A and 10B in the example illustrated in FIG. 1) is electrically connected to the electric wire 21 of the printed circuit board 20 via the terminal unit for a printed circuit board 32 of the conductive support pedestal 30. Impedance of the conductive support pedestal 30 is made greater than impedance of each of the members (e.g., a power device, a power supply, a high-capacity condenser, and other equipment associated with motor driving) connected to the bus bars 10A and 10B, whereby current (a broken-line arrow in FIG. 1) lower than current (a solid-line arrow in FIG. 1) flowing from the bus bar 10A to the bus bar 10B can be passed to the electric wire 21 of the printed circuit board 20 from the bus bar 10A. In other words, current flowing to the bus bar 10A can be divided into high current flowing to the bus bar 10B and low current flowing into the electric wire 21 of the printed circuit board 20 by suitably adjusting the impedance of the conductive support pedestal 30. Examples of connection destinations of the electric wire 21 include a control circuit for controlling power conversion of a power conversion circuit having a power device, a detection circuit for detecting current or voltage used for various kinds of processing such as power conversion and abnormality detection, a snubber circuit for protecting a circuit from a surge voltage generated during an on/off time of the power device, and the like.

Note that in FIG. 1, a current path having a bent portion is formed by connecting the two bus bars 10A and 10B to one hole for screw passing 31 provided in the conductive support pedestal 30, as one example. According to the first embodiment, a current path having a branch portion can be formed when the number of the bus bars 10 connected to one hole for screw passing 31 provided in the conductive support pedestal 30 is three or more. For example, a current path having a Y-shaped branch can be formed when the number of the bus bars 10 connected to one hole for screw passing 31 provided in the conductive support pedestal 30 is three. For example, a current path having an X-shaped branch can be formed when the number of the bus bars 10 connected to one hole for screw passing 31 provided in the conductive support pedestal 30 is four.

Now, strength of the bus bar in the motor drive apparatus according to the first embodiment and a manufacturing method of the bus bar are described in comparison with a conventional example.

Figure 4A:
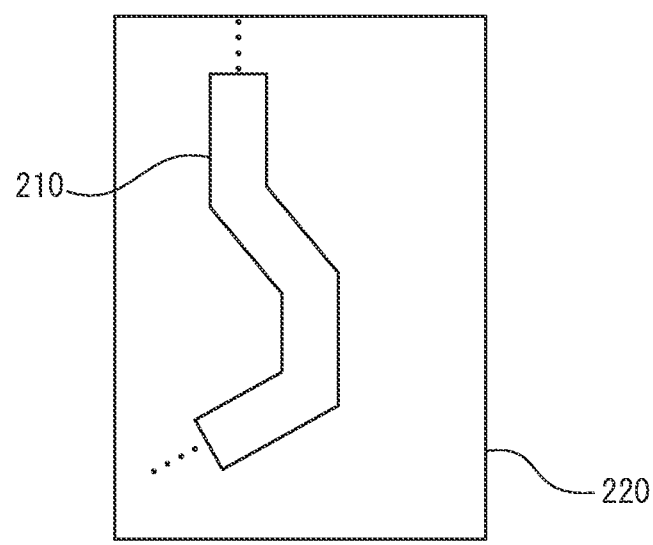
FIG. 4A is a view exemplifying a shape of a conventional bus bar having a complicated shape, and is a top view illustrating a positional relation between the bus bar and a printed circuit board.
Figure 4B:
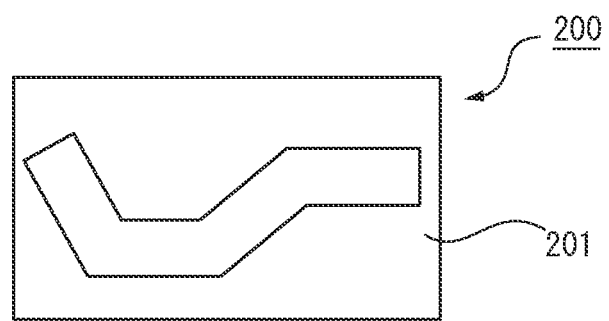
FIG. 4B is a view exemplifying a shape of the conventional bus bar having a complicated shape, and is a top view illustrating a waste material produced when the bus bar is manufactured by performing sheet metal working on a metal plate.

FIG. 4A is a view exemplifying a shape of a conventional bus bar having a complicated shape, and is a top view illustrating a positional relation between the bus bar and a printed circuit board. FIG. 4B is a view exemplifying a shape of the conventional bus bar having a complicated shape, and is a top view illustrating a waste material produced when the bus bar is manufactured by performing sheet metal working on a metal plate.

Conventionally, even the bus bar 210 having a complicated shape as illustrated in FIG. 4A is not provided with a support pedestal for supporting the bus bar 210 on a printed circuit board 220, and relies on support by a member such as a power device connected to the bus bar 210. Therefore, vibration tends to be generated in the bus bar, and the strength is also weaker in the bus bar 210. Moreover, since there are various shapes of the bus bar 210 depending on a disposition of a component in a motor drive apparatus and a dimension, a shape, and the like of the motor drive apparatus, a stock of a plurality of kinds of bus bars different in shape have to be secured for manufacture of the motor drive apparatus, leading to a problem of complicated manufacture management. Moreover, a die that creates a complicated shape of the bus bar 210 needs to be prepared, leading to a problem of an increased manufacturing cost of the motor drive apparatus. Additionally, as illustrated in FIG. 4B, an area of a waste material 201 is increased by performing sheet metal working on a metal plate 200 to be a raw material with a die that creates a complicated shape of the bus bar 210, leading to a problem of an increased manufacturing cost of the motor drive apparatus.

Figure 5A:
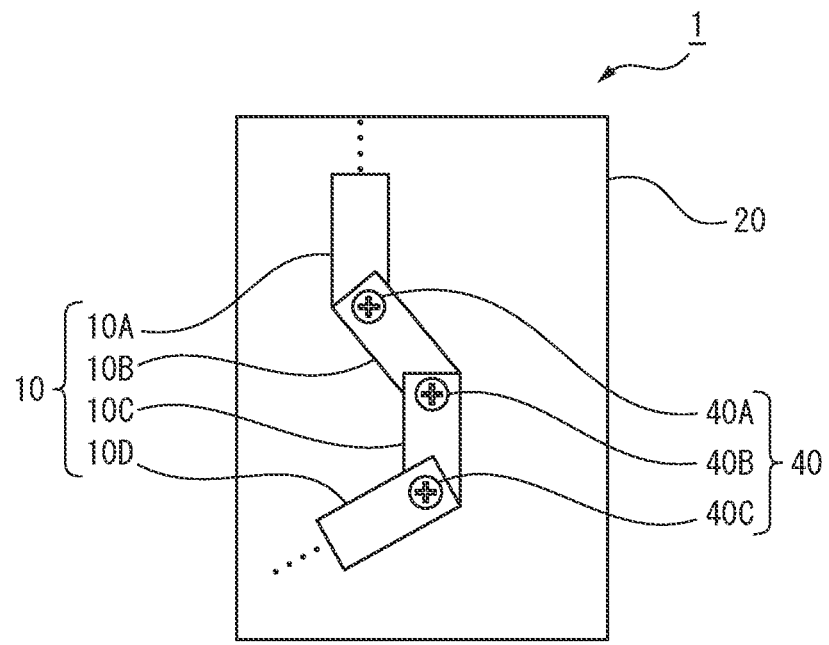
FIG. 5A is a view exemplifying a shape of the bus bar in the first embodiment of the present disclosure, and is a top view illustrating a positional relation between the bus bar and the printed circuit board.
Figure 5B:
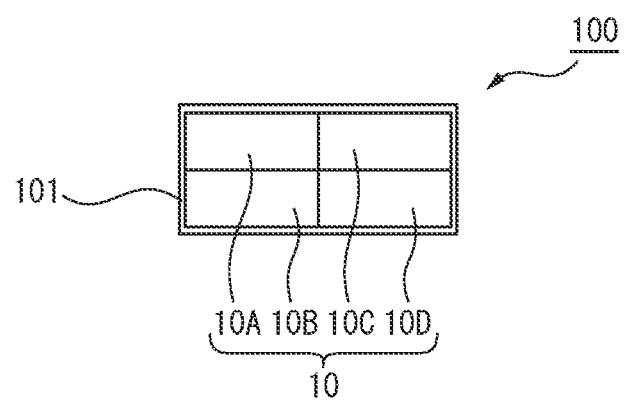
FIG. 5B is a view exemplifying a shape of the bus bar in the first embodiment of the present disclosure, and is a top view illustrating a waste material produced when the bus bar is manufactured by performing sheet metal working on a metal plate.

FIG. 5A is a view exemplifying a shape of the bus bar in the first embodiment of the present disclosure, and is a top view illustrating a positional relation between the bus bar and the printed circuit board. FIG. 5B is a view exemplifying a shape of the bus bar in the first embodiment of the present disclosure, and is a top view illustrating a waste material produced when the bus bar is manufactured by performing sheet metal working on a metal plate. The shape of current paths illustrated in FIGS. 5A and 5B is one example, and the current paths may have any other shape.

When a current path having a complicated shape as illustrated in FIG. 5A is formed, the conductive support pedestal 30 is disposed on the printed circuit board 20 of a bent portion of the current path. Then, the screw 40 (screws 40A, 40B, and 40C in the example illustrated in FIGS. 5A and 5B) is put into the holes for screw passing 11 of the bus bar 10 (the bus bars 10A, 10B, 10C, and 10D in the example illustrated in FIGS. 5A and 5B) molded into a rectangular-parallelepiped shape (straight plate shape) and the hole for screw passing 31 of the conductive support pedestal 30. The bus bar 10A, the bus bar 10B, and the conductive support pedestal 30 are electrically and physically connected to one another by fastening with screw tightening via the screw 40A. The bus bar 10B, the bus bar 10C, and the conductive support pedestal 30 are electrically and physically connected to one another by fastening with screw tightening via the screw 40B. The bus bar 10C, the bus bar 10D, and the conductive support pedestal 30 are electrically and physically connected to one another by fastening with screw tightening via the screw 40C. By providing a plurality of conductive support pedestals 30 in the printed circuit board 20, and connecting the bus bar 10 to each of the conductive support pedestals 30 in such a way that the plurality of bus bars 10 are arranged, current paths having various shapes and lengths can be formed. Thus, according to the first embodiment, since the bus bars 10A, 10B, 10C, and 10D are physically fixed to the printed circuit board 20 via the terminal unit for a printed circuit board 32 of the conductive support pedestal 30 in a portion to be a bent portion of a current path, strength and vibration resistance are high.

Furthermore, since the bus bar 10 has a rectangular-parallelepiped shape (straight plate shape), a die that creates the bus bar 10 has a simple shape and is therefore low in cost, and the motor drive apparatus can be manufactured at low cost. Since a combination of a plurality of bus bars 10 having different dimensions and having a rectangular-parallelepiped shape can adapt to any shape of a current path, manufacture management of the motor drive apparatus can be simplified. Moreover, as illustrated in FIG. 5B, since sheet metal working is performed on a metal plate 100 to be a raw material with a die that creates a simple rectangular-parallelepiped shape, the metal plate 100 can be effectively utilized, an area of a waste material 101 can be reduced, and as a result, the motor drive apparatus can be manufactured at low cost.

Still further, although the electric wire 21 provided in the printed circuit board 20 is not illustrated in FIGS. 5A and 5B, the bus bar 10 (i.e. the bus bar 10A, 10B, 10C, or 10D) can be electrically connected, via the terminal unit for a printed circuit board 32 of the conductive support pedestal 30, to the electric wire 21 provided in the printed circuit board 20.

Now, a motor drive apparatus according to a second embodiment of the present disclosure is described.

Figure 6:
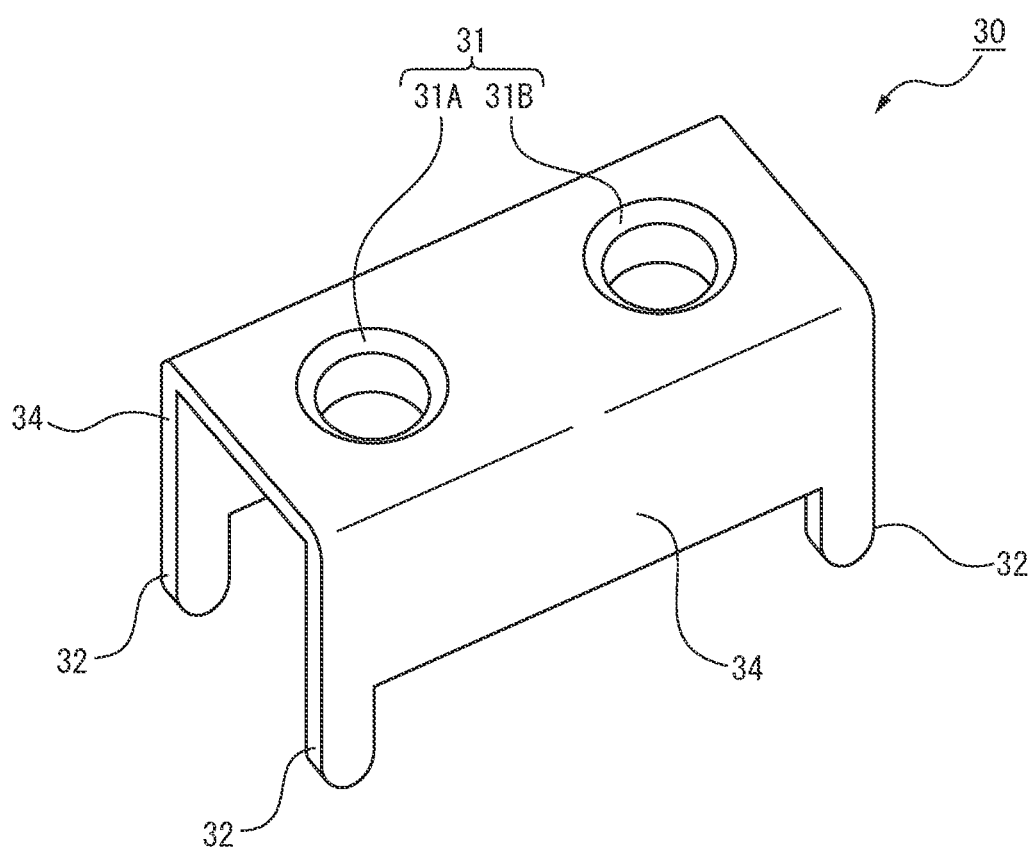
FIG. 6 is a perspective view illustrating a conductive support pedestal in a motor drive apparatus according to a second embodiment of the present disclosure.
Figure 7:
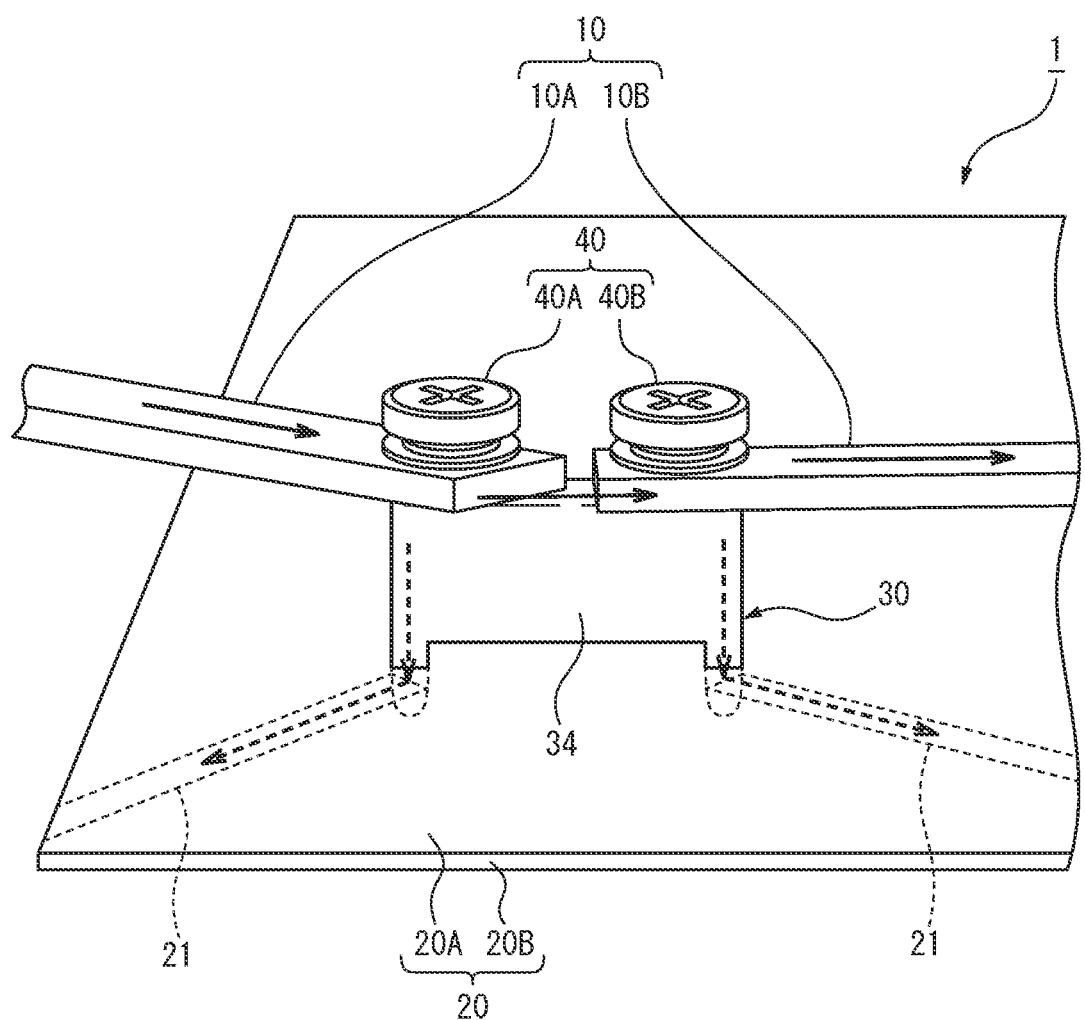
FIG. 7 is a perspective view illustrating a connection structure for a bus bar, a printed circuit board, and the conductive support pedestal in the motor drive apparatus according to the second embodiment of the present disclosure.

FIG. 6 is a perspective view illustrating a conductive support pedestal in the motor drive apparatus according to the second embodiment of the present disclosure. FIG. 7 is a perspective view illustrating a connection structure for a bus bar, a printed circuit board, and the conductive support pedestal in the motor drive apparatus according to the second embodiment of the present disclosure.

A motor drive apparatus 1 according to the second embodiment of the present disclosure includes a bus bar 10, a printed circuit board 20, and a conductive support pedestal 30, as in the first embodiment. However, the second embodiment is different from the first embodiment in that the conductive support pedestal 30 includes a plurality of holes for screw passing 31, and in that one of the plurality of bus bars 10 is connected to each of the holes for screw passing 31. Since the bus bar 10 and the printed circuit board 20 in the second embodiment are similar to those in the first embodiment, description is omitted.

The conductive support pedestal 30 in the second embodiment is mounted on the printed circuit board 20, and interposed between the bus bar 10 and the printed circuit board 20, as in the first embodiment. The conductive support pedestal 30 includes an upper plate portion 33, a pair of side plate portions 34 extended from a pair of edges of the upper plate portion 33 in a direction crossing the upper plate portion 33 and disposed with a space in between, and the side plate portions 34 are attached at ends thereof to the printed circuit board 20. Further, a terminal unit for a printed circuit board 32 configured to electrically connect an electric wire 21 of the printed circuit board 20 to the conductive support pedestal 30 by soldering is provided at the end of the side plate portion 34. The terminal unit for a printed circuit board 32 has, for example, a claw shape with a spring property (elasticity). The terminal unit for a printed circuit board 32 fits into a hole provided in the printed circuit board 20, thereby firmly fixing the conductive support pedestal 30 onto a first surface 20A or a second surface 20B of the printed circuit board 20, and electrically connecting the electric wire 21 provided inside the printed circuit board 20 to the conductive support pedestal 30. In the example illustrated in FIG. 7, the conductive support pedestal 30 is mounted on the first surface 20A of the printed circuit board 20 via the terminal unit for a printed circuit board 32, as one example. A shape of the terminal unit for a printed circuit board 32 may be a shape other than the illustrated claw shape. Moreover, for example, the terminal unit for a printed circuit board 32 may be electrically connected to the electric wire 21 provided inside the printed circuit board 20 via a land provided in the printed circuit board 20.

In the second embodiment, a plurality of holes for screw passing 31 for fastening the bus bar 10 and the conductive support pedestal 30 with screw tightening are provided in the upper plate portion 33 or the side plate portion 34 of the conductive support pedestal 30. By providing a plurality of conductive support pedestals 30 in the printed circuit board 20, and connecting at least one bus bar 10 to each of the plurality of holes for screw passing 31 provided in the conductive support pedestal 30 in such a way that the plurality of bus bars 10 are arranged, current paths having various shapes and lengths can be formed.

In the example illustrated in FIGS. 6 and 7, two holes for screw passing 31A and 31B are provided in the upper plate portion 33, as one example. When a bent portion being a portion that does not become straight is produced in a current path depending on a disposition of a component in a motor drive apparatus and a dimension, a shape, and the like of the motor drive apparatus, the conductive support pedestal 30 is disposed on the printed circuit board 20 (the first surface 20A in the example illustrated in FIG. 7) immediately under the bent portion. Then, a screw 40 is put into the holes for screw passing 11 of the bus bars 10A and 10B molded into a rectangular-parallelepiped shape (straight plate shape) and the hole for screw passing 31 of the conductive support pedestal 30, and the bus bar 10A, the bus bar 10B, and the conductive support pedestal 30 are electrically and physically connected to one another by fastening with screw tightening via the screw 40. Thus, according to the second embodiment, since the bus bar 10 is physically fixed to the printed circuit board 20 via the terminal unit for a printed circuit board 32 of the conductive support pedestal 30 in a portion to be a bent portion of a current path, strength and vibration resistance are high. Moreover, according to the second embodiment, a calorific value generated by flow of current through the bus bar 10 is low as compared with the first embodiment in which a plurality of bus bars 10 are connected to one hole for screw passing 31.

According to the second embodiment, positions where the holes for screw passing 31A and 31B are provided are suitably selected from the upper plate portion 33 and two side plate portions 34, and the bus bars 10A and 10B molded into a rectangular-parallelepiped shape (straight plate shape) are respectively connected to the holes for screw passing 31A and 31B, whereby a current path bending in various directions can be formed.

Furthermore, according to the second embodiment, a current path having a branch portion can be formed when the number of the holes for screw passing 31 provided in the conductive support pedestal 30 is three or more. For example, a current path having a Y-shaped branch can be formed when three bus bars 10 are each connected to each of the three holes for screw passing 31 provided in the conductive support pedestal 30. For example, a current path having an X-shaped branch can be formed when four bus bars 10 are each connected to each of the four holes for screw passing 31 provided in the conductive support pedestal 30.

Still further, in the second embodiment as well, impedance of the conductive support pedestal 30 is made greater than impedance of each of the members (e.g., a power device, a power supply, a high-capacity condenser, and other equipment associated with motor driving) connected to the bus bars 10A and 10B, whereby current (a broken-line arrow in FIG. 7) lower than current (a solid-line arrow in FIG. 7) flowing from the bus bar 10A to the bus bar 10B can be passed to the electric wire 21 of the printed circuit board 20 from the bus bar 10A.

Figure 8:
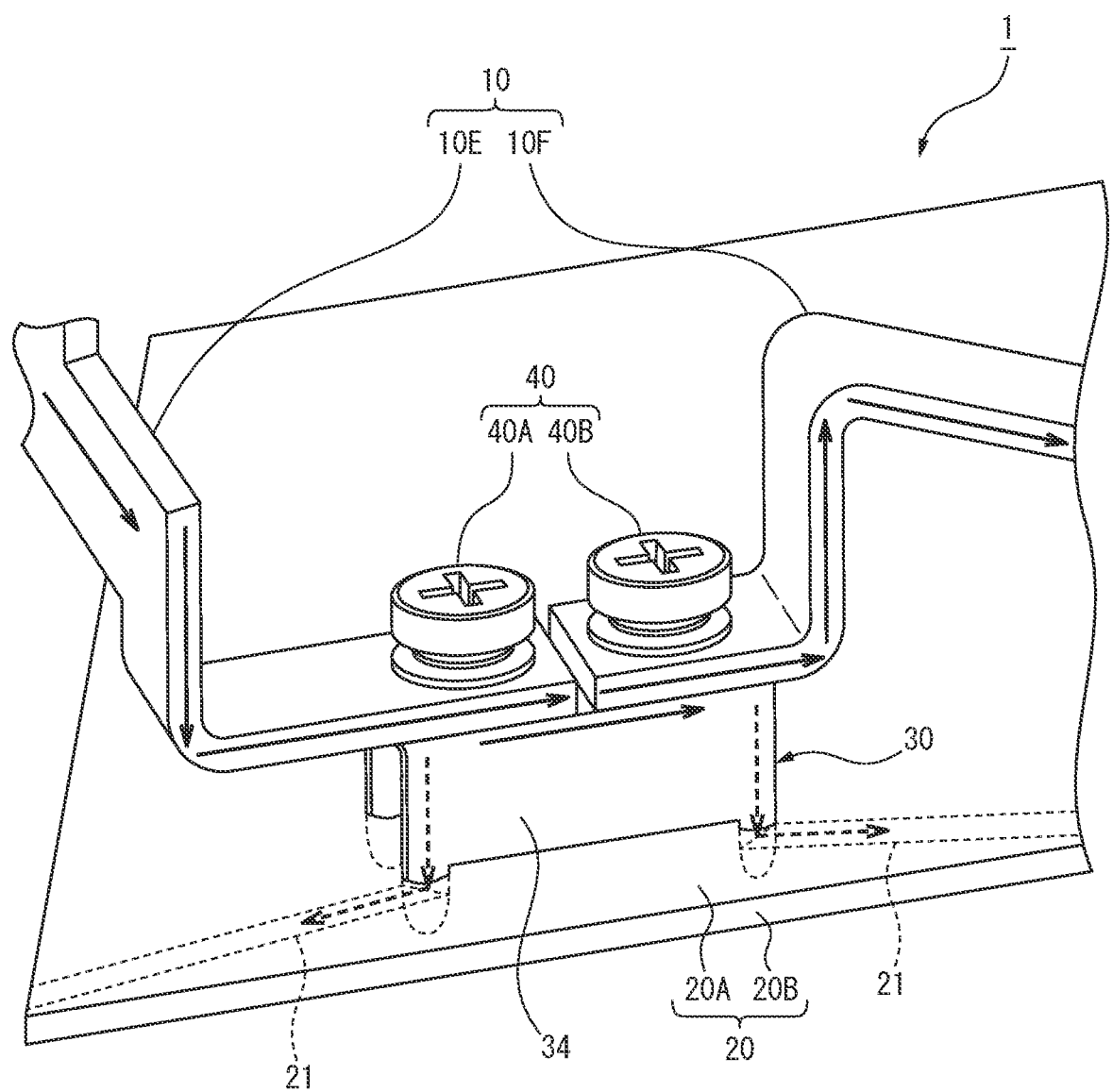
FIG. 8 is a perspective view illustrating a connection structure for a bus bar, a printed circuit board, and a conductive support pedestal in a motor drive apparatus according to a modification example of the second embodiment of the present disclosure.

Note that the bus bar 10 described above has a rectangular-parallelepiped shape, but as a modification example thereof, the bus bar 10 having a bent portion may be connected to the conductive support pedestal 30. FIG. 8 is a perspective view illustrating a connection structure for a bus bar, a printed circuit board, and a conductive support pedestal in a motor drive apparatus according to a modification example of the second embodiment of the present disclosure. While a case where bus bars 10E and 10F having bent portions are connected to the conductive support pedestal 30 in the second embodiment is described as one example in the present modification example, similar description holds true for a case of connecting to the conductive support pedestal 30 in the first embodiment. A degree of freedom of wiring of a current path inside the motor drive apparatus 1 is increased by providing the bent portions in the bus bars 10E and 10F connected to the conductive support pedestal 30. However, since the bus bars 10E and 10F having the bent portions may not be manufactured by simple sheet metal working as in a bus bar having a rectangular-parallelepiped shape, a manufacturing cost increases.

The first embodiment and the second embodiment described above may be implemented in combination. In other words, a number of branches of a current path larger than the number of the holes for screw passing 31 can be formed by connecting two or more bus bars to one hole for screw passing 31 among a plurality of holes for screw passing 31 provided in the conductive support pedestal 30.

Now, an application example of the first and second embodiments is described. In the present application example, a plurality of printed circuit boards 20 are connected to each other via the conductive support pedestal 30 and the bus bar 10 described above, thereby firmly fixing the plurality of printed circuit boards 20 to each other.

Figure 9:
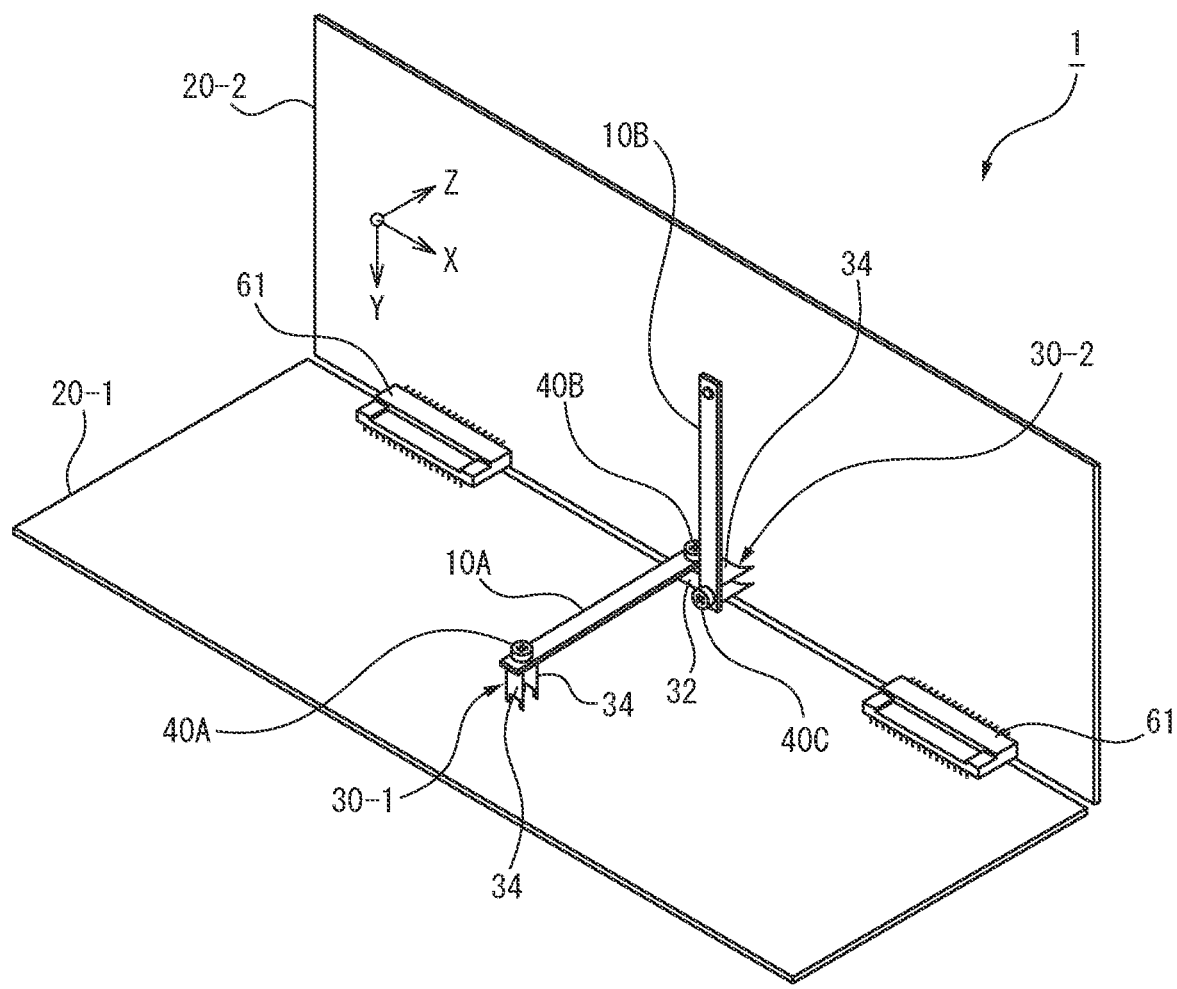
FIG. 9 is a perspective view illustrating a connection structure for a bus bar, a printed circuit board, and a conductive support pedestal in a motor drive apparatus according to an application example of the first and second embodiments of the present disclosure.

FIG. 9 is a perspective view illustrating a connection structure for a bus bar, a printed circuit board, and a conductive support pedestal in a motor drive apparatus according to the application example of the first and second embodiments of the present disclosure. FIG. 9 describes, as one example, a case where two printed circuit boards 20-1 and 20-2 are fixed via a conductive support pedestal 30-2 in the second embodiment.

The terminal unit for a printed circuit board 32 of a conductive support pedestal 30-1 in the first embodiment is attached to the printed circuit board 20-1 having a normal in a Y-axis direction, and the conductive support pedestal 30-1 is thereby mounted on the printed circuit board 20-1. One end of the bus bar 10A and the upper plate portion 33 of the conductive support pedestal 30-1 are electrically and physically connected to each other by fastening with screw tightening via a screw 40A. Moreover, an integrated circuit 61 is mounted on the printed circuit board 20-1, and, for example, the bus bar 10A and the integrated circuit 61 are electrically connected to each other via the electric wire 21 (not illustrated in FIG. 9) connected to the terminal unit for a printed circuit board 32 of the conductive support pedestal 30-1.

The terminal unit for a printed circuit board 32 of a conductive support pedestal 30-2 in the second embodiment is attached to the printed circuit board 20-2 having a normal in a Z-axis direction, and the conductive support pedestal 30-2 is thereby mounted on the printed circuit board 20-2. One end of the bus bar 10A and the side plate portion 34 of the conductive support pedestal 30-2 are electrically and physically connected to each other by fastening with screw tightening via a screw 40B. Thus, the terminal unit for a printed circuit board 32 of the conductive support pedestal 30-2 is fixed to the printed circuit board 20-2, and the side plate portions 34 of the conductive support pedestal 30-2 are fixed to the printed circuit board 20-1 via the bus bar 10A and the conductive support pedestal 30-1, whereby the printed circuit board 20-1 having a normal in the Y-axis direction and the printed circuit board 20-2 having a normal in the Z-axis direction are firmly fixed at an angle of about 90 degrees.

The example illustrated in FIG. 9 is merely one example. A kind of conductive support pedestal 30 (the first embodiment and/or the second embodiment), the number of holes for screw passing 31 to be provided, a position where the hole for screw passing 31 is provided (the upper plate portion 33 and/or the side plate portions 34), and how to fix the bus bar 10 and the conductive support pedestal 30 (the first embodiment and/or the second embodiment) may be suitably selected depending on the number of the printed circuit boards 20 to be fixed, and an angle at which the printed circuit boards 20 are fixed to each other. According to the present application example, a plurality of printed circuit boards 20 can be firmly fixed to each other at various angles via the conductive support pedestal 30 and the bus bar 10, and vibration resistance is improved.

Now, a modification example of the bus bar 10 and the conductive support pedestal 30 is described. In the present modification example, ribs are provided in the bus bar 10 and the conductive support pedestal 30, and bending strength thereof is thereby enhanced.

Figure 10:
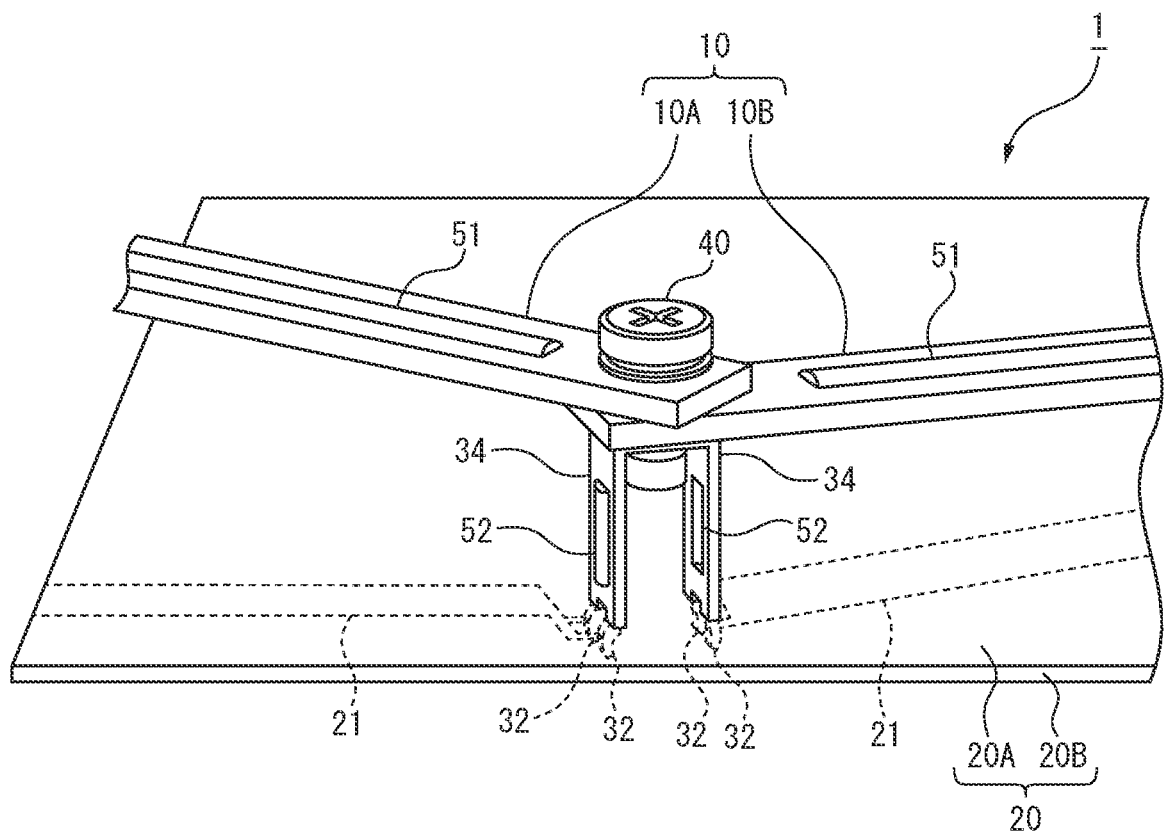
FIG. 10 is a perspective view of a case where a rib for securing bending strength is provided in each of a bus bar and a conductive support pedestal in a motor drive apparatus according to one embodiment of the present disclosure.
Figure 11A:
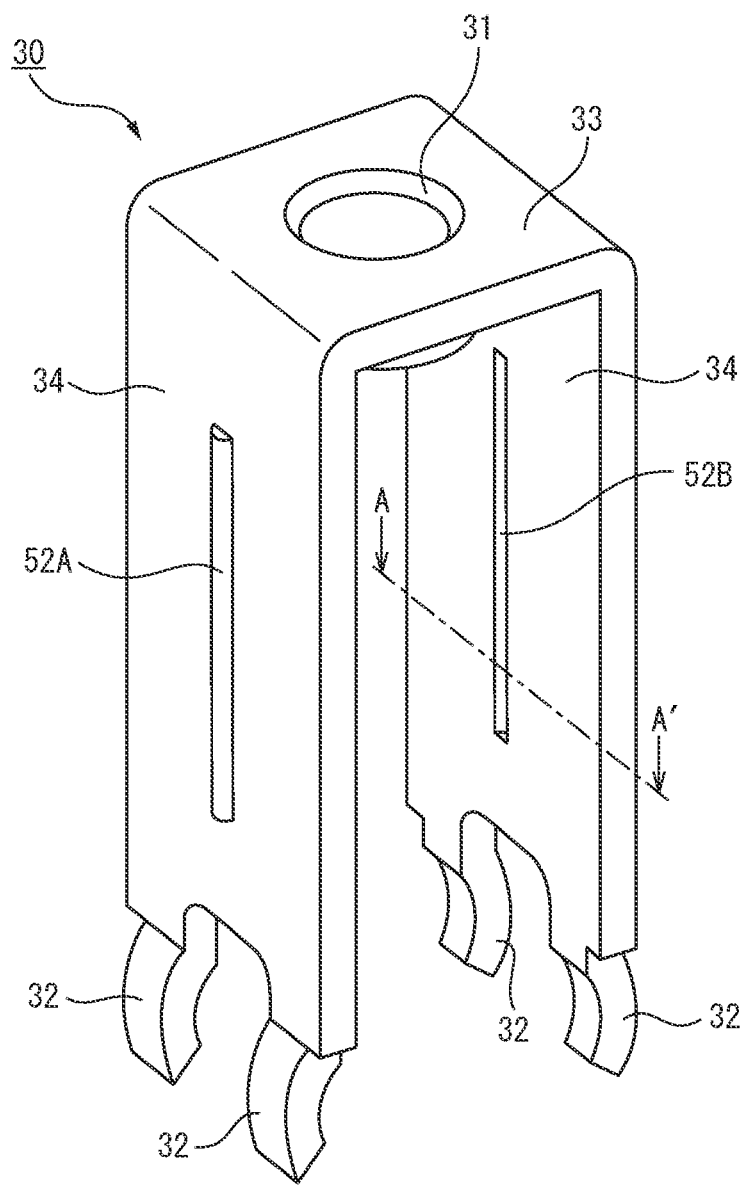
FIG. 11A is a perspective view illustrating a conductive support pedestal provided with a rib in a motor drive apparatus according to one embodiment of the present disclosure.
Figure 11B:
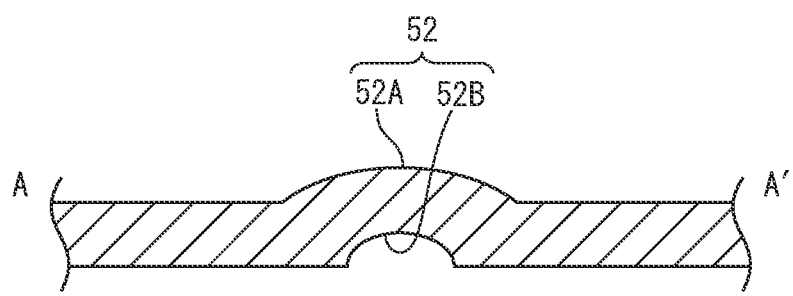
FIG. 11B is a view illustrating the conductive support pedestal provided with the rib in the motor drive apparatus according to one embodiment of the present disclosure, and is an A-A' sectional view of FIG. 11A.

FIG. 10 is a perspective view of a case where a rib for securing bending strength is provided in each of a bus bar and a conductive support pedestal in a motor drive apparatus according to one embodiment of the present disclosure. FIG. 11A is a perspective view illustrating the conductive support pedestal provided with a rib in the motor drive apparatus according to one embodiment of the present disclosure. FIG. 11B is a view illustrating the conductive support pedestal provided with a rib in the motor drive apparatus according to one embodiment of the present disclosure, and is an A-A' sectional view of FIG. 11A. A rib 51 provided in the bus bar 10 and a rib 52 provided in the conductive support pedestal 30 each has a protrusion and a depression obtained by press work on a flat plate-shaped metal member. For example, as illustrated in FIGS. 11A and 11B, the rib 52 has a protrusion 52A and a depression 52B in the conductive support pedestal 30. The ribs 51 and 52 may be provided at any place where bending strength is desired to be secured in the bus bar 10 and the conductive support pedestal 30. Although a case where the rib 52 is provided in the side plate portion 34 of the conductive support pedestal 30 according to the first embodiment is illustrated as one example in the example illustrated in FIGS. 11A and 11B, the rib 52 may be provided in the upper plate portion 33, or the rib 52 may be provided in the upper plate portion 33 and/or the side plate portion 34 of the conductive support pedestal 30 in the second embodiment. Thus, strength (breakage resistance) and vibration resistance are increased by providing ribs in the bus bar 10 and the conductive support pedestal 30.

Now, a further application example of the motor drive apparatus 1 having a connection structure as described above is described with reference to FIG. 12. Since a pair of side plate portions 34 included in the conductive support pedestal 30 have relatively large dimensions, the side plate portion 34 of the conductive support pedestal 30 mounted on the printed circuit board 20 are set to function as drip-proof walls for other mounted components of the printed circuit board 20, or function as walls for constituting a ventilation passage for other mounted components of the printed circuit board 20, in the present application example.

Figure 12:
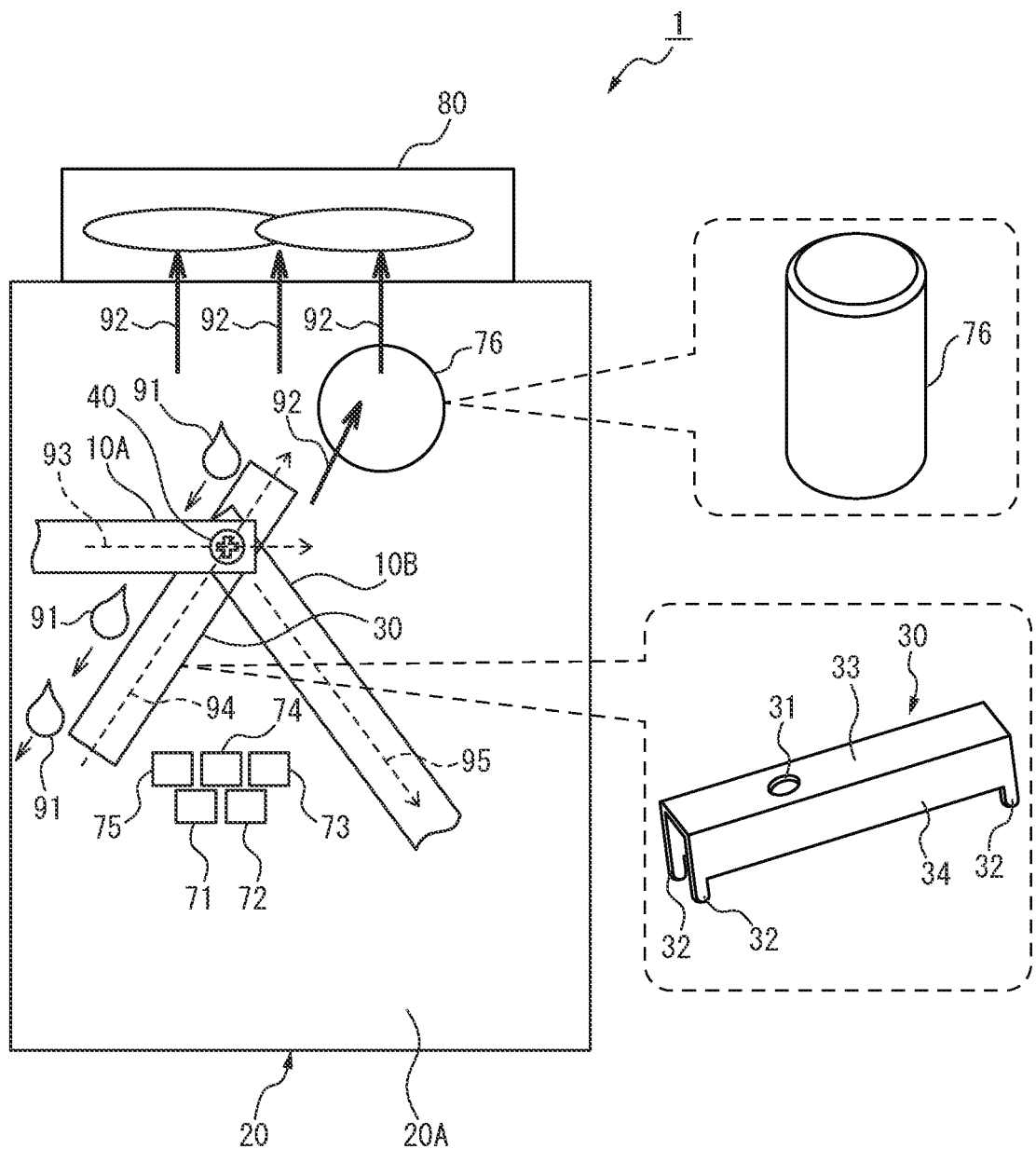
FIG. 12 is a front view exemplifying a printed circuit board in which a conductive support pedestal functions as a wall constituting a drip-proof wall and a ventilation passage in a motor drive apparatus according to one embodiment of the present disclosure.

FIG. 12 is a front view exemplifying a printed circuit board in which a conductive support pedestal functions as a wall constituting a drip-proof wall and a ventilation passage in a motor drive apparatus according to one embodiment of the present disclosure. An example in which the printed circuit board 20 is placed in a vertically erected state in the motor drive apparatus 1 is described as one example. In the illustrated example, the conductive support pedestal 30 for supporting the bus bars 10A and 10B, components 71 to 75 such as a chip resistance, and an electrolytic condenser 76 are mounted on the first surface 20A of the printed circuit board 20. Moreover, a cooling fan 80 for cooling mounted components on the printed circuit board 20 is placed above the printed circuit board 20. The kinds, number, and positional relation of the members illustrated in FIG. 12 are merely one example.

For example, when the motor drive apparatus 1 is used as a drive source for driving a motor in a machine tool, cutting fluid may drip from above the printed circuit board 20. When the components 71 to 75 for which sticking of cutting fluid 91 is desired to be avoided are located under the conductive support pedestal 30, the conductive support pedestal 30 is mounted on the printed circuit board 20 in such a way that an outflow source of the cutting fluid and the components 71 to 75 are located opposite to each other across the side plate portion 34 of the conductive support pedestal 30, as illustrated in FIG. 12. Thus, the cutting fluid dripping from above changes flow into a direction along the side plate portion 34 by colliding with the side plate portion 34 of the conductive support pedestal 30, and the cutting fluid no longer sticks to the components 71 to 75. Thus, the side plate portion 34 of the conductive support pedestal 30 can be set to function as a drip-proof wall for other mounted components of the printed circuit board 20.

Furthermore, a component that generates heat, such as the electrolytic condenser 76, is cooled by air that is caused to flow by the cooling fan 80. In the illustrated example, the cooling fan 80 causes air to flow in a direction (a direction of an arrow 92) from a bottom side of the printed circuit board 20 toward a top side thereof, but air sucked up by the cooling fan 80 collides with the electrolytic condenser 76 when the conductive support pedestal 30 is mounted on the printed circuit board 20 in such a way that a longitudinal direction of the side plate portion 34 of the conductive support pedestal 30 becomes a direction of an arrow 94. Consequently, the electrolytic condenser 76 can be cooled. Thus, the side plate portion 34 of the conductive support pedestal 30 can be set to function as walls constituting a ventilation passage for other mounted components of the printed circuit board 20. Note that the bus bars 10A and 10B are supported at positions apart from the printed circuit board 20 by the conductive support pedestal 30, and therefore do not have a great influence on the ventilation passage described above.

Since the direction of the side plate portion 34 of the conductive support pedestal 30 is relatively free as long as the conductive support pedestal 30 can support the bus bars 10A and 10B, an angle made by the direction 94 along the side plate portion 34 of the conductive support pedestal 30, and an extending direction 93 of the bus bar 10A and an extending direction 95 of the bus bar 10B may be suitably designed depending on a positional relation between an outflow source of the cutting fluid and a mounted component for which sticking of the cutting fluid is desired to be avoided or a positional relation between the cooling fan 80 and a mounted component that is desired to be cooled.

According to one aspect of the present disclosure, a motor drive apparatus including a connection structure for a bus bar, a power device, and a printed circuit board with high strength, high vibration resistance, and a low cost can be achieved.

The invention claimed is:

1. A motor drive apparatus comprising:
   a plurality of bus bars through which a current associated with motor driving flows;
   a printed circuit board; and
   a conductive support pedestal mounted on the printed circuit board, and interposed between the bus bar and the printed circuit board, wherein
   the conductive support pedestal includes
   at least one hole for screw passing configured to fasten the bus bar and the conductive support pedestal with screw tightening, and
   a terminal unit for a printed circuit board configured to electrically connect an electric wire provided in the printed circuit board to the conductive support pedestal, wherein the plurality of bus bars are connected to the one hole for screw passing provided on the conductive support pedestal.

2. The motor drive apparatus according to claim 1, wherein each one of a plurality of the bus bars is connected to each of a plurality of the holes for screw passing provided in the conductive support pedestal.

3. The motor drive apparatus according to claim 1, wherein
   the conductive support pedestal includes
   an upper plate portion, and
   a pair of side plate portions extended from a pair of edges of the upper plate portion in a direction crossing the upper plate portion and disposed with a space in between, the side plate portion being attached at ends thereof to the printed circuit board, and
   the holes for screw passing is provided in the upper plate portion or the side plate portion.

4. The motor drive apparatus according to claim 3, wherein the upper plate portion and the side plate portion constitute a drip-proof wall for other mounted component of the printed circuit board.

5. The motor drive apparatus according to claim 3, wherein the upper plate portion and the side plate portion constitute a ventilation passage for other mounted component of the printed circuit board.

6. The motor drive apparatus according to claim 1, wherein a plurality of the conductive support pedestals are provided in the printed circuit board.

7. The motor drive apparatus according to claim 1, wherein a plurality of the printed circuit boards are connected to each other via the conductive support pedestal.

8. The motor drive apparatus according to claim 1, wherein the bus bar has a rib that secures bending strength of the bus bar.

9. The motor drive apparatus according to claim 1, wherein the conductive support pedestal has a rib that secures bending strength of the conductive support pedestal.

10. The motor drive apparatus according to claim 1, wherein the bus bar has a rectangular-parallelepiped shape.

\* \* \* \* \*